United States Patent
Tsuru et al.

(10) Patent No.: US 9,297,473 B2
(45) Date of Patent: Mar. 29, 2016

(54) SOLENOID VALVE WITH ARMATURE GUIDE

(71) Applicant: NABTESCO CORPORATION, Tokyo (JP)

(72) Inventors: Nobuyuki Tsuru, Kobe (JP); Hiroshi Akase, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 126 days.

(21) Appl. No.: 14/347,325

(22) PCT Filed: Sep. 24, 2012

(86) PCT No.: PCT/JP2012/074357
§ 371 (c)(1),
(2) Date: Mar. 26, 2014

(87) PCT Pub. No.: WO2013/047417
PCT Pub. Date: Apr. 4, 2013

(65) Prior Publication Data
US 2014/0225018 A1    Aug. 14, 2014

(30) Foreign Application Priority Data
Sep. 28, 2011    (JP) ................................. 2011-212351

(51) Int. Cl.
*F16K 31/06*    (2006.01)
*F02M 63/00*    (2006.01)
(Continued)

(52) U.S. Cl.
CPC .......... *F16K 31/0658* (2013.01); *F02M 47/027* (2013.01); *F02M 63/0019* (2013.01);
(Continued)

(58) Field of Classification Search
CPC ............ F16K 31/0658; F16K 31/0693; F02M 63/0071; F02M 63/0078; F02M 63/0019; F02M 63/0021; F02M 47/027; F02M 2200/08; H01F 2007/086

USPC ........................... 251/129.15–129.16, 129.07
See application file for complete search history.

(56) References Cited

U.S. PATENT DOCUMENTS 2,631,612 A * 3/1953 Buescher ............ F16K 31/0658
                                                    251/127
3,861,643 A * 1/1975 Moffatt .................. F02M 61/20
                                                    251/129.08
(Continued)

FOREIGN PATENT DOCUMENTS

CN            1723345 A      1/2006
DE     102006055548 A1      5/2008
(Continued)

OTHER PUBLICATIONS

Office Action issued on Feb. 28, 2015 in corresponding Chinese Patent Application No. CN1723345A.
(Continued)

*Primary Examiner* — John Bastianelli
(74) *Attorney, Agent, or Firm* — Duane Morris LLP

(57) ABSTRACT

A coil (96) attracting an armature (80) is housed in a main body part (70). A valve part (82) adapted to rest on and move off a valve seat (74) is formed integral with the armature (80). The valve seat (74) is disposed at a location between a high-pressure path (78) and a low-pressure path (83). When the valve part (82) rests on the valve seat (74), the high-pressure path (78) and the low-pressure path (83) are disconnected from each other, while, when the valve part (82) moves off the valve seat (74), the high-pressure path (78) and the low-pressure path (83) communicate with each other. A through-hole (86) is formed in a portion of the armature (80) through which a smaller amount of magnetic flux from the coil (96) passes. A guide pin (102) secured to the main body part (70) engages with the through-hole (86).

2 Claims, 4 Drawing Sheets

(51) Int. Cl.
*F02M 47/02* (2006.01)
*H01F 7/08* (2006.01)

(52) U.S. Cl.
CPC ....... *F02M63/0021* (2013.01); *F02M 63/0071* (2013.01); *F02M 63/0078* (2013.01); *F02M 2200/08* (2013.01); *H01F 2007/086* (2013.01)

(56) References Cited

U.S. PATENT DOCUMENTS

| | | | | |
|---|---|---|---|---|
| 4,197,996 | A * | 4/1980 | Giardini | F02M 49/02 239/585.5 |
| 4,356,980 | A * | 11/1982 | Krauss | F02M 51/065 251/129.14 |
| 4,569,504 | A * | 2/1986 | Doyle | H01F 7/1638 251/129.15 |
| 5,054,691 | A * | 10/1991 | Huang | F02M 51/0639 239/585.3 |
| 5,110,087 | A * | 5/1992 | Studtmann | H01F 7/13 251/129.16 |
| 5,626,325 | A * | 5/1997 | Buchanan | F02M 57/023 137/539.5 |
| 5,839,661 | A * | 11/1998 | Iwanaga | F02D 41/3827 239/533.8 |
| 6,000,628 | A * | 12/1999 | Lorraine | F02M 51/0671 123/499 |
| 6,758,419 | B2 * | 7/2004 | Yildirim | F02M 51/0664 239/585.4 |
| 6,764,061 | B2 * | 7/2004 | Haeberer | F02M 47/027 251/129.16 |
| 6,808,133 | B1 * | 10/2004 | Stier | F02M 51/0614 239/585.1 |
| 7,159,843 | B1 * | 1/2007 | Mullally | F16K 31/0655 251/129.16 |
| 2006/0226252 | A1 | 10/2006 | Kubo et al. | |
| 2009/0026230 | A1 * | 1/2009 | Robinson | B05C 5/0225 222/504 |
| 2010/0175670 | A1 * | 7/2010 | Coldren | F02M 47/027 239/89 |

FOREIGN PATENT DOCUMENTS

| | | |
|---|---|---|
| EP | 2278152 A1 | 1/2011 |
| EP | 2092187 B1 | 11/2011 |
| EP | 2278152 B1 | 1/2014 |
| JP | 2000-55229 A | 2/2000 |
| JP | 2002-139168 A | 5/2002 |
| JP | 2006-22721 A | 1/2006 |
| JP | 2007-056861 A | 3/2007 |
| JP | 2007-56861 A * | 3/2007 |
| JP | 2007-182903 A | 7/2007 |
| JP | 2009-216081 A | 9/2009 |
| JP | 2010-174820 A | 8/2010 |
| WO | 2008055724 A1 | 5/2008 |
| WO | 2008061844 A1 | 5/2008 |

OTHER PUBLICATIONS

International Search Report from PCT/JP2012/074357 dated Oct. 12, 2014, 2 pages.

European Patent Office, Supplementary European Search Report issued on Mar. 11, 2015 in connection with corresponding European Patent Application No. 12835516.1, pp. 1-7.

* cited by examiner

SOLENOID VALVE WITH ARMATURE GUIDE

TECHNICAL FIELD

This invention relates to an electromagnetic valve, for example to an solenoid valve for use in fuel injection valves.

BACKGROUND ART

An example of electromagnetic valve used in a fuel injection valve of a common rail system is disclosed in Patent Literature 1. The fuel injection valve disclosed in Patent Literature 1 is composed of components including a nozzle body 2, a needle 3, a holder body 4, an orifice plate 6, and an electromagnetic unit 8, as shown in FIG. 4. The nozzle body 2 is coupled by a retaining nut 10 to the lower end portion of the body holder 4 with the orifice plate 6 disposed therebetween. A guide hole 12 is formed in the nozzle body 2 to extend therethrough from the top end surface to the tip end of the nozzle body 2. The needle 3 is disposed in the guide hole 12 in such a manner that it can freely slide in the guide hole 12. An injection port 14 is formed in the tip end of the guide hole 12 through which fuel is injected when the needle 3 moves upward. A high-pressure path 16 is formed by a gap between the inner circumferential surface of the guide hole 12 and the outer circumferential surface of the needle 3. The high-pressure path 16 guides highly pressurized fuel to the injection port 14. At a location between the two ends of the guide hole 12, a fuel reservoir 18 is formed by enlarging the inner diameter of the guide hole 12. The upper end of the high-pressure path 16 opens in the top end surface of the nozzle body 2 and is connected to a high-pressure path 20 in the orifice plate 6. The high-pressure path 20 is connected via a high-pressure path 22 in the holder body 4 to a pipe joint 24 disposed at the upper end of the holder body 4, and the pipe joint 24 is supplied with high-pressure fuel from a common rail.

A cylindrical spring seat 26 is press-fitted into and secured to the guide hole 12, and a spring 28 is disposed between the spring seat 26 and the needle 3. The spring 28 urges the needle 3 in the direction to close the valve, or in the downward direction in FIG. 4. The inner circumferential surface of the spring seat 26 provides a back-pressure chamber 30 for providing a pressure of high-pressure fuel to the upper end surface of the needle 3 as a back pressure. This back pressure also urges the needle 3 in the valve-closing direction. The pressure of the high-pressure fuel in the fuel reservoir 18 urges the needle 3 in the direction to open the valve, or in the upward direction in FIG. 4.

As shown in FIG. 5, an inlet path 32 and an outlet path 34 are formed in the orifice plate 6. The inlet path 32 is a path through which high-pressure fuel flows from the high-pressure path 20 into the back-pressure chamber 30, and an outlet path 34 is a path through which the high-pressure fuel flows from the back-pressure chamber 30 to a low pressure side.

The electromagnetic unit 8 is housed in the holder body 4. The electromagnetic unit 8 includes a stator 38 having an electromagnetic coil 36 wound around a plastic bobbin. The electromagnetic unit 8 includes also an armature 40 facing and movable relative to the stator 38. The electromagnetic unit 8 further includes a ball valve 42 movable with the armature 40 to open and close the outlet path 34. The stator 38 has, in its center, a vertically extending spring housing hole 44 in which a spring 46 is housed. The spring 46 presses the armature 40 so that the ball valve 42 is pressed toward the outlet path 34. The lower portion of the stator 38 functions as a valve chest in which the ball valve 42 is housed and which is filled with low-pressure fuel flowing from the outlet path 34. An annular groove 48 is formed in the upper surface of the orifice plate 6. A straight groove 50 extends outward from the annular groove 48, and the low-pressure fuel in the valve chest flows out into a low-pressure path 52 through the groove 50.

The armature 40 has a disc member 54, which is disposed to face the stator 38 and form a magnetic circuit with the stator 38. A pedestal 56 is formed in the center of the disc member 54, and an abutting portion 58 extends from the pedestal 56 toward the ball valve 42. The ball valve 42 sits in the abutting portion 58. A plurality of through-holes 60 are concentrically formed in the disc member 54. Guide pins 62 are inserted into some of the through-holes 60. The guide pins 62 are secured to the orifice plate 6. The through-holes 60 are formed at such locations as to interrupt the magnetic circuit formed by the disc member 54 and the stator 38.

In a state where no electric power is being supplied to the electromagnetic coil 36, the ball valve 42 closes the outlet path 34, and, therefore, the hydraulic pressure in the back-pressure chamber 30 plus the force given by the spring 28 to urge the needle 3 in the direction to close the valve is larger than the hydraulic pressure in the fuel reservoir 18 which acts to urge the needle 3 in the direction to open the valve. Accordingly, the needle 3 closes the injection port 14 so that the fuel is not injected. When electric power is supplied to the electromagnetic coil 36, magnetic flux is generated around the electromagnetic coil 36, so that the stator 38 and the armature 40 are magnetized, causing the armature 40 to be attracted toward the stator 38. As a result, the armature 40 moves toward the stator 38 against the force of the spring 46, being guided by the guide pins 62. This causes the ball valve 42, receiving the hydraulic pressure in the back-pressure chamber 30, to open the outlet path 34 whereby the high-pressure fuel in the back-pressure chamber 30 is released into the valve chest of the ball valve 42. Then, the hydraulic pressure in the back-pressure chamber 30 decreases so that the force to move the needle 3 in the direction to open the valve becomes greater. This makes the needle 3 move upward so that the fuel is injected through the injection port 14.

PRIOR ART LITERATURE

Patent Literature

Patent Literature 1: Japan Patent Publication 2010-174820A

SUMMARY OF INVENTION

Technical Problem to be Solved by the Invention

The through-holes 60 of the solenoid valve of Patent Literature 1, into which the guide pins 62 are inserted, are formed in those portions of the disc member 54 at which the magnetic force generated by the electromagnetic coil 36 is concentrated. This disadvantageously results in smaller electromagnetic attractive force for attracting the armature 40, so that the armature 40 cannot move toward the stator 38 at a high speed. Solenoid valves used in common rail systems are required to move at a high speed, and the technology disclosed in Patent Literature 1 cannot meet such requirement.

An object of the present invention is to provide an electromagnetic valve or solenoid valve which can move at a high speed.

Means to Solve the Problem

According to one embodiment of the present invention, the solenoid valve includes a main body in which a coil is housed.

An armature is adapted to be attracted by the coil. A valve part is formed integral with the armature. The valve part is adapted to rest on and move away from a valve seat. The valve seat is disposed between a high-pressure path and a low-pressure path. When the valve part rests on the valve seat, the high-pressure and low-pressure paths are disconnected from each other, and, when the valve part moves away from the valve seat, the high-pressure and low-pressure paths communicate with each other. A guided portion is formed in the armature by removing a portion of the armature through which a smaller amount of magnetic flux from the coil passes. A guide secured to the main body is disposed to engage with the guided portion. In this way, the armature is held by the guide in such a manner that it can move between the on-position where the valve part is rest on the valve seat and the off-position where the valve part is off the valve seat.

The guided portion is formed in the portion of the armature where there is little magnetic flux, and, therefore a major part of the magnetic flux generated by the coil passes through the armature. Therefore the armature can move toward a stator by an attracting force, which is not reduced as in solenoid valves such as one described in Patent Literature 1. Further, since the valve part is formed integral with the armature and no abutting portion as required in the valve described in Patent Literature 1 is formed, the armature can be light-weighted and can be moved at a high speed.

The armature may include a magnetic portion and a high-strength portion. The magnetic portion is in a location where the magnetic flux density is high and formed of a magnetic material. The high-strength portion is in a location where the magnetic flux density is low and is formed of a high-strength material exhibiting relatively high strength. The magnetic portion and the high-strength portion are secured to each other. The guided portion is formed in the form of a hole extending through the high-strength portion, which can prevent the armature from cracking.

A plurality of such guided portions may be formed to extend through the armature. In this case, one or more, less than the total number of the plural guided portions, engage with the guide(s), and the remaining guided portion(s) can be used as an oil releaser(s). The guided portions are used as part of a guiding arrangement and also as an oil releaser, and therefore the guiding arrangement and the oil releaser can be formed simultaneously in a single processing, which can simplify the working for producing the solenoid valve as a whole.

Advantageous Effect of Invention

The present invention provides an armature movable at a high speed, whereby solenoid valves suitable for use in a common rail system, for example, can be provided.

DESCRIPTION OF EMBODIMENT

As in the above-described background art, a solenoid valve according to one embodiment of the present invention is used in a fuel injection valve for use in a common rail system. The solenoid valve is arranged such that, when electric power is supplied to a coil thereof, an armature is moved to make a high-pressure fluid flow into a low-pressure path. The flow of the high-pressure fluid into the low-pressure path causes a nozzle, which is in a position to close an injection port, to move, which, in turn, causes the high-pressure fuel to be supplied to a cylinder of a diesel engine through the injection port.

Figure 1:
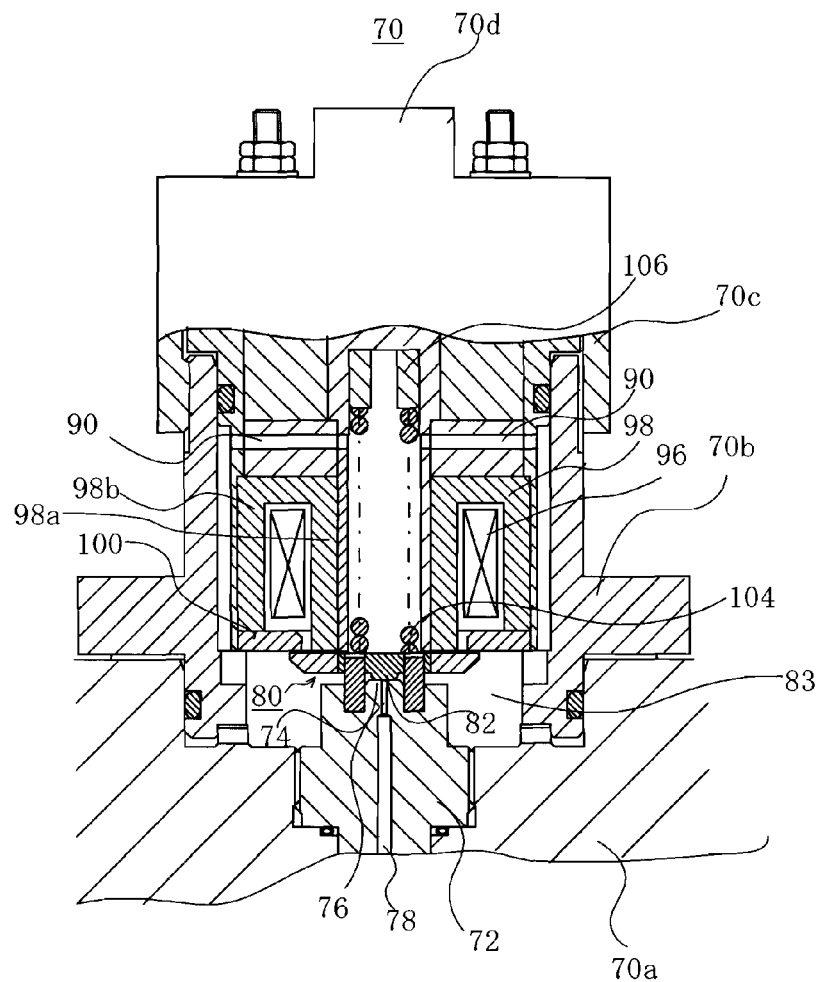
FIG. 1 is an enlarged cross-sectional view of part of a solenoid valve according to an embodiment of the present invention.

As shown in FIG. 1, the solenoid valve has a main body part 70, which is composed of a base part 70*a*, a trunk part 70*b*, a connecting part 70*c*, a head part 70*d*, etc. In the upper end surface of the base part 70*a*, a depression exhibiting a step-shaped longitudinal cross-section, and, in this depression, a valve seat providing member 72 are disposed. At the center of one end, the upper end in FIG. 1, of the valve seat providing member 72, a valve seat 74 is formed. An orifice 76 and an outlet path 78 are arranged to extend through the valve seat providing member 72 in the named order from the valve seat side. The orifice 76 and the outlet path 78 form together the high-pressure path. A high-pressure fluid is supplied to the valve seat 74 through the high-pressure path.

A valve part 82 formed in the armature 80 is adapted to rest on the valve seat 74 to thereby close the valve seat 74. As will be described later, the armature 80 is movable in the upward and downward directions in FIG. 1, and, when the armature 80 is in the raised position, the valve part 82 is off the valve seat 74. When the valve part 82 is off the valve seat 74, the high-pressure fluid flowing out through the valve seat 74 flows out into the low-pressure path 83. The low-pressure path 83 is provided around the valve seat providing member 72 by part of the trunk part 70*b* extending into the above-described depression. The low-pressure oil in the low-pressure path 83 is let out through a path (not shown). In the valve shown according to the above-described background art, the ball valve is used to open and close the valve seat, but, according to the embodiment being described, the valve part 82 integral with the armature 80 operates to open and close the valve seat 74. There is no need for forming, in the armature 80, the abutting portion to hold the ball valve, which is required for the valve of the background art, and, thus, the armature 80 according to the embodiment is lighter in weight than the one of the described background art.

Figure 3:
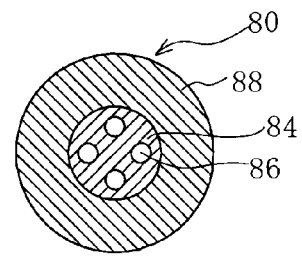
FIG. 3 is a transverse cross-sectional view of an armature used in the solenoid valve of FIG. 1.

The armature 80 has a high-strength portion 84 at its center, as shown in FIG. 3. The high-strength portion 84 is made of a high-strength material having relatively high strength, e.g. steel or titanium, and is disc-shaped. A plurality of guided portions, e.g. through-holes 86, are formed in the high-strength portion 84 by removing portions of the high-strength portion 84, e.g. by boring. The through-holes 86 extend through the high-strength portion 84 in the vertical direction in FIG. 1. For example, four through-holes 86 are formed, being spaced from each other in the circumferential direction and concentrically arranged. A magnetic portion 88 is formed around and in contact with the peripheral surface of the high-strength portion 84. The magnetic portion 88 is made of a magnetic material. For example, the magnetic portion 88 is a ring-shaped member made of compacted magnetic powder, and is fitted over the high-strength portion 84 to be integral therewith.

Figure 2:
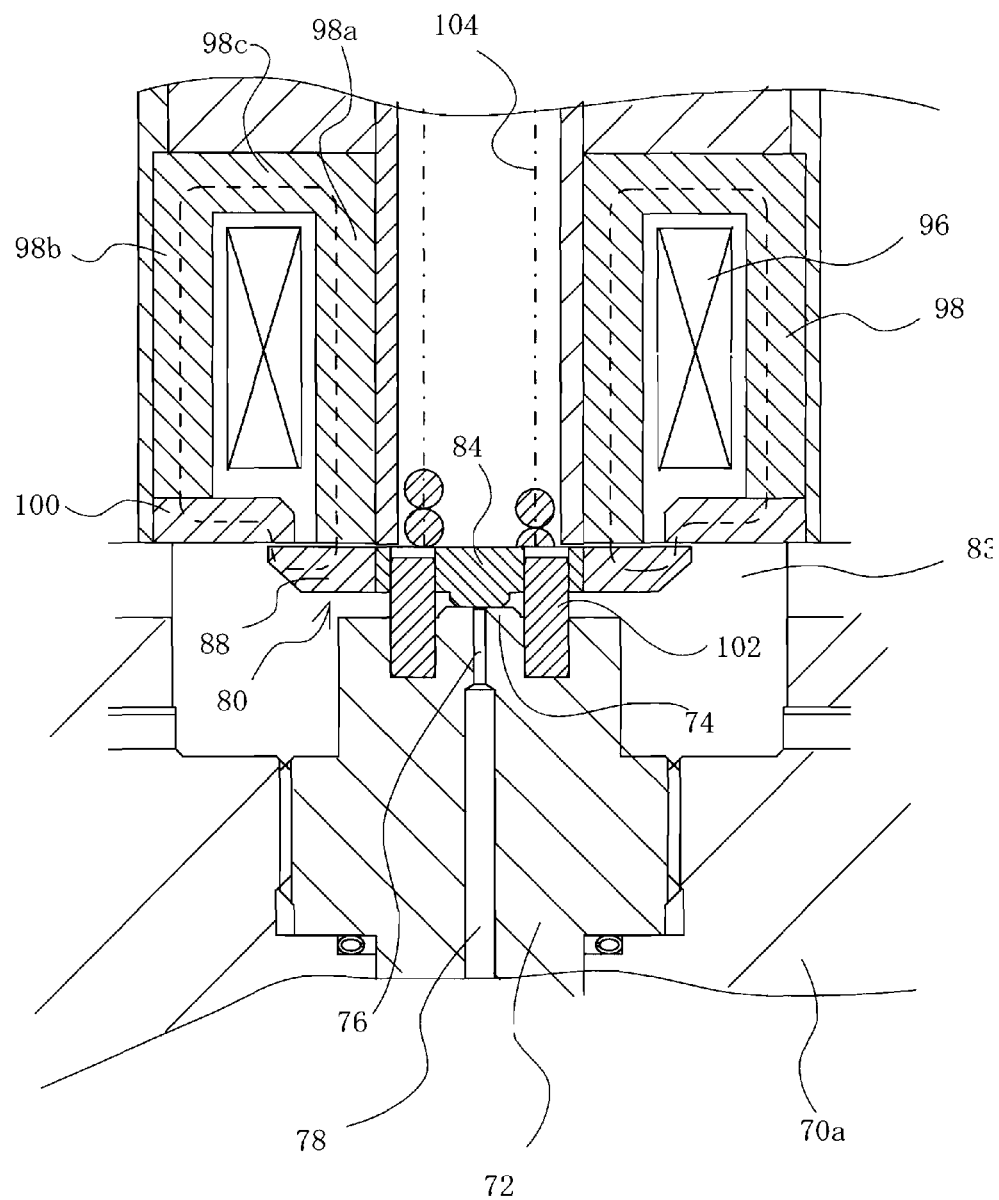
FIG. 2 is a cross-sectional view of part of the solenoid valve of FIG. 1.
Figure 4:
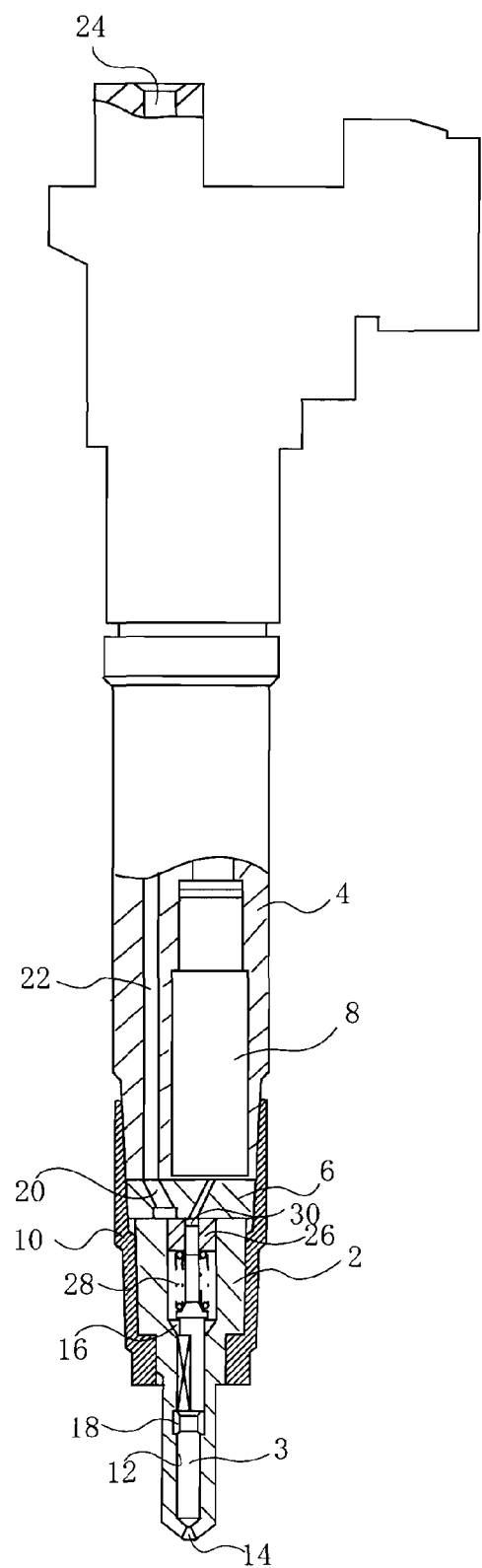
FIG. 4 is a side view of a fuel injection valve in which a solenoid valve according to a prior art is used.
Figure 5:
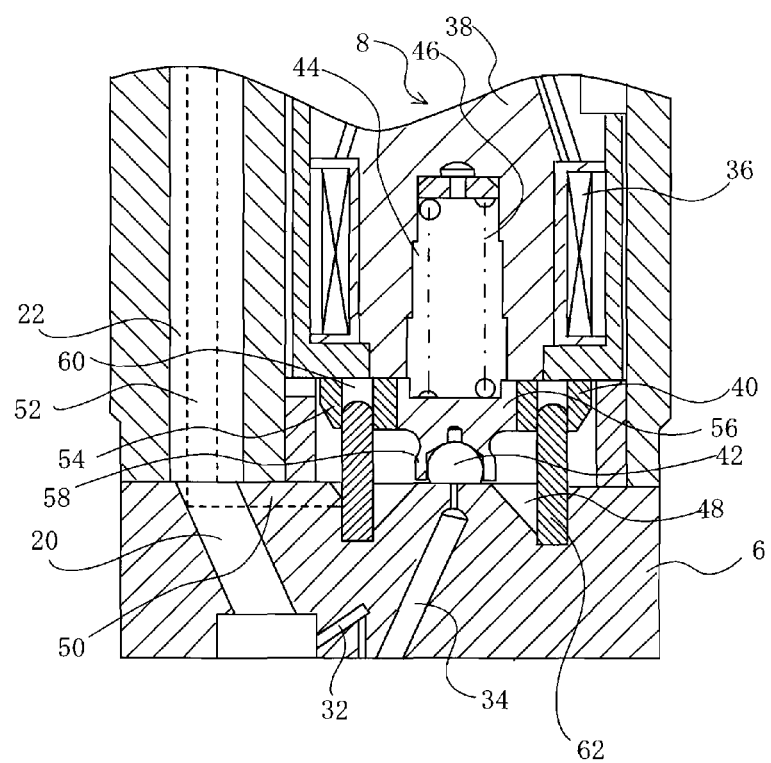
FIG. 5 is an enlarged cross-sectional view of part of the fuel injection valve of FIG. 4.

A coil 96 is disposed in a portion within the main body part 70 above the armature 80. The coil 96 is wound around a core 98, which functions as a stator. As shown in FIG. 2, the core 98 has a central inner cylindrical portion 98a. One end, e.g. a lower end, of the inner cylindrical portion 98a is located above the magnetic portion 88 with a small gap disposed between them. The core 98 has an outer cylindrical portion 98b disposed, being spaced from the inner cylindrical portion 98b, or, more specifically, outward of the outer periphery of the armature 80. One end, e.g. a lower end, of the outer cylindrical portion 98b is located at a level above the upper surface of the magnetic portion 88. The other ends, e.g. the upper ends, of the inner and outer cylindrical portions 98a and 98b are at the same level and are coupled to each other by a connecting portion 98c. The coil 96 is wound within the space formed between these cylindrical portions 98a and 98b. A disc-shaped magnetic flux concentrating member 100 is disposed to extend from the lower end of the outer cylindrical portion 98b to the magnetic portion 88 of the armature 80. Then, when electric power is applied to the coil 96, magnetic flux is concentrated in the inner cylindrical portion 98a, the connecting portion 98c, the outer cylindrical portion 98b, the magnetic flux concentrating member 100 and the magnetic portion 88, as indicated by broken lines in FIG. 2, resulting in high magnetic flux density in these portions, while the magnetic flux density in the central high-strength portion 84 is low. When the coil 96 is energized, the armature 80 is magnetized with the above-mentioned magnetic flux and is attracted by the core 98. The shapes of the core 98 and the magnetic flux concentrating member 100 are not restricted to the described ones, but any other suitable arrangements may be employed. For example, the magnetic flux concentrating member 100 and the outer cylindrical portion 98b may be formed integral with each other, while the inner cylindrical portion 98a and the outer cylindrical portion 98b are formed to be separate from each other.

Guides, e.g. guide pins 102 are inserted into predetermined ones of the above-described four through-holes 86 in the high-strength portion 84. For example, the guide pins 102 are inserted into two of the through-holes 86 which face each other across the center of the high-strength portion 84. The proximal ends of these guide pins 102 are placed in and secured to holes formed in the valve seat providing member 72 around the valve seat 74. The guide pins 102 guide the armature 80 as the armature 80 moves upward or downward when the coil 96 is energized or de-energized, as described above. The through-holes 86 guided by the guide pins 102 are formed in the high-strength portion 84 where no cracks should be formed by forming the through-holes 86. As is seen in FIG. 2, the through-holes 86 are located in the high-strength portion 84 away from the portion of the armature 80 where the magnetic flux is concentrated when the coil 96 is energized. Thus, the through-holes 86 do not interrupt the concentration of the magnetic flux, and the armature 80 can move at a high speed.

Inward of the inner cylindrical portion 98a of the core 98, disposed is elastic means, e.g. a coil spring 104, of which one end is in contact with the high-strength portion 84 of the armature 80, and the other end of which is in contact with the head part 70d of the main body part 70 with a spring rest 106 disposed therebetween, as shown in FIG. 1. The coil spring 104 is compressed against its spring force when the armature 80 is raised in response to energization of the coil 96, and quickly lowers the armature 80 onto the valve seat 74 through its spring force in response to de-energization of the coil 96.

The through-holes 86 guided along the guide pins 102 of the solenoid valve of the present invention are formed in the high-strength portion 84 of the armature 80, as described above, and the high-strength portion 84 is formed in an area where the density of magnetic flux from the coil 96 is low.

Therefore, the magnetic force acting to attract the armature 80 is not weakened by the presence of the through-holes 86, so that the armature 80 can be attracted at a high speed. Further, since the valve part 82 is formed integral with the armature 80, there is no need for forming an abutting portion on the armature 80 as in the prior art valve. Accordingly, the armature 80 can be light in weight and, therefore, can move more quickly. The magnetic portion 88 of the armature 80 is made of compacted magnetic powder, which results in reduced eddy current. With eddy current reduced, the magnetic attractive force can be larger, which results in further quick movement of the armature 80. Since the solenoid valve of this invention employs an arrangement in which a plurality of through-holes 86 are formed and the guide pins 102 are provided in some of them, one or more of through-holes well guided by the guide pins 102 can be selectively used. This results in improved guiding performance, and, can reduce the number of adjustments to be done to the through-holes 86 which otherwise would be required for improving the guiding performance. In addition, the through-holes 86 through which no guide pins 102 are inserted can function as oil releasers. When the armature 80 moves, oil is released out from or supplied to the space between the armature 80 and the coil 96 through the through-holes 86 with no guide pins inserted. In addition to the through-holes 86, holes 90 are formed above the coil 96, which operate to release oil like the through-holes 86 free of the guide pins 102.

The present invention has been described as being embodied in a fuel injection valve for a common rail system, but it is not limited to such use. The invention can be embodied in any other valves which are arranged to operate to flow a high-pressure fluid into a lower-pressure side when they are opened.

DESCRIPTION OF REFERENCE NUMERALS

70: Main Body Part
74: Valve Seat
80: Armature
82: Valve Part
84: High-strength Portion
86: Through-holes (Guided Portion)
88: Magnetic Portion
96: Coil
102: Guide Pins (Guide)

The invention claimed is:
1. A solenoid valve comprising:
a main body part;
a coil housed in said main body part;
an armature adapted to be attracted by said coil;
a valve part formed integral with said armature; and
a valve seat which said valve part is adapted to rest on and move off;
said valve seat being disposed between a high-pressure path and a low-pressure path;
said valve part, when resting on said valve seat, disconnecting said high-pressure path and said low-pressure path from each other, said valve part, when moving off said valve seat, making said high-pressure path and said low-pressure path communicate with each other;
said solenoid valve further comprising:
a guided portion for said armature formed in a portion of said armature through which a smaller amount of magnetic flux from said coil passes; and
a guide secured to said main body part, said guide engaging with said guided portion, said guide supporting said armature in such a manner that said armature is movable between the rest position and the off-position:

wherein said armature comprises a magnetic portion made of a magnetic material and disposed at a location where the density of the magnetic flux generated by said coil is high, and a high-strength portion made of a high-strength material having a relatively high strength and disposed at a location where the density of the magnetic flux generated by said coil is low, said magnetic portion and said high-strength portion being secured to each other; and said guided portion of said armature is formed in the shape of a through-hole in said high-strength portion.

2. A solenoid valve according to claim 1, wherein a plurality of said guided portions are formed through said armature, less than all of said guided portions engaging with said guide with the rest of said guided portions used as an oil releaser.

* * * * *